United States Patent Office 3,563,774
Patented Feb. 16, 1971

3,563,774
GUNNING REFRACTORY
Glen W. Charles, Mexico, Mo., assignor, by mesne assignments, to A. P. Green Refractories Co., Mexico, Mo., a corporation of Delaware
No Drawing. Filed Nov. 2, 1967, Ser. No. 680,032
Int. Cl. C04b 35/44
U.S. Cl. 106—64                                5 Claims

ABSTRACT OF THE DISCLOSURE

A gunning refractory of the hydraulic setting agent type having low rebound loss and of a composition of 60% to 90% by weight of acid and/or neutral refractory aggregate filler, from 10% to 40% calcium aluminate cement, from 0.1% to 5% plaster of Paris, and from 0.01% to 5% short fiber asbestos.

BACKGROUND OF THE INVENTION (1) Field of the invention

The present invention relates to improved plasticity and workability of refractory materials and particularly relates to improved gunnability of refractory castables, ramming mixes, and gunning mixes.

(2) Description of the prior art

A gunning refractory is one which is suitable for emplacement by pneumatic means. A common method of doing this is to transport the refractory mixture from a storage vessel by air to a nozzle where it is mixed with water automatically and then directed against a wall or enclosure which is to be coated with the refractory. One of the difficulties encountered in this procedure is that of getting the refractory mixture to stick to the wall. A poor quality refractory mixture will allow a high percentage of the mixture to bounce off the wall and be lost. This lost material is referred to as "rebounds" or rebound loss. Such a mixture also may lose preferentially certain portions of the mixture, resulting in emplacement of a refractory widely different in composition from the starting material. Rebound loss in refractories containing pure calcium aluminate cement is an object of concern in the art and it is to this problem which the present invention is directed as a solution.

SUMMARY OF THE INVENTION

The present invention comprises an improved refractory product including about 60% to about 90% by weight of an inert aggregate filler, from about 10% to about 40% hydraulic setting agent, from about 0.1% to about 5% plaster of Paris, and about 0.01% and about 5% short fiber asbestos.

DETAILED DESCRIPTION OF THE INVENTION

Briefly, according to our embodiment of this invention, an improved refractory is provided having good strength and low rebound loss when gunned. It is comprised of a selected acid refractory such as fireclay (an inert filler material), a calcium aluminate binder, with additions of plaster of Paris and short fiber asbestos. Compositions manufactured according to the methods of this invention are comprised of 60% to 90% by weight of a size graded acid and/or neutral refractory aggregate filler, and from 10% to 40% calcium aluminate cement, to which is added from 0.1% to 5% plaster of Paris and and from 0.01% to 5% short fiber asbestos. Best results are obtained when the plaster of Paris addition is between 0.1% to 2.0% and the short fiber asbestos addition is between 0.01% and 0.5% by weight, of the dry solids in the mixture. Upwards of 5% plaster of Paris and short fiber asbestos can be used, but these higher amounts are not suggested, for several reasons. About 5% plaster of Paris causes the mix to set up too quickly and also causes a decrease in refractoriness and strength when used with calcium aluminate cement binders. A short fiber asbestos addition above 5% increases the water required for gunning and decreases the density and strength. The asbestos is of about ⅛ to about ¹⁄₆₄ inch in length.

For this invention, suitable chemically inert refractory filler materials of commerce are, for example, as follows: chrome ore, calcined alumina, calcined South American bauxite, calcined diaspore, burley diaspore, kyanite, silica, ganister, quartzite, and other fireclay, silica and alumina refractory materials, alumina ores and the like, calcium silicates, zircon, etc. Lightweight aggregates are also usable for this purpose. They include such as haydite, vermiculite, expanded fireclay, perlite, etc.

The inert filler material is size graded to less than 3 mesh and is about 45% to about 60% greater than 20 mesh and about 40% to about 55% —20 mesh. Preferably, the filler contains 30% to 40% of 4 to 10 mesh material, 15% to 20% of 10 to 20 mesh material, and 17% to 22% of 20 to 48 mesh material, with the remainder finer than 48 mesh.

The calcium aluminate may be any suitable calcium aluminate cement, such as the cements sold in commerce and referred to as CA–25 cement, Rolandshutte cement, Lumnite cement, etc. Exemplary chemical analyses of a usable calcium aluminate cement is as follows: (by weight on the basis of an oxide analysis)

TABLE I

|  | Percent |
|---|---|
| Silica ($SiO_2$) | 0.1 |
| Alumina ($Al_2O_3$) | 79.0 |
| Iron oxide ($Fe_2O_3$) | 0.3 |
| Lime (CaO) | 18.0 |
| Magnesia (MgO) | 0.4 |
| Alkalies ($Na_2O$) | 0.5 |
| LOI (1100° C.) | 1.5 |

The calcium aluminate cement is a minimum of 90% through 200 mesh.

Table II shows the results of tests to establish beneficial gunning properties of a preferred composition having plaster of Paris and short fiber asbestos additions according to the invention.

TABLE II

| Mix | A | B |
|---|---|---|
| Inert filler material | 82.5 | 82.5 |
| Calcium aluminate cement | 17.5 | 17.5 |
| Plaster of Paris (added extra) | 0 | 0.5 |
| Short fiber asbestos (added extra) | 0 | 0.1 |
| Water added during gunning, percent | 5–8 | 5–8 |
| Rebound loss,* percent | 35–40 | 10–15 |

*The rebound figure is expressed as a percentage of the material that did not bounce off.

The inert filler material is a mixture of calcined flint, calcined bauxite and raw kyanite and is 72.5% 4 mesh and finer and 10% 35 mesh and finer.

Mix B, having plaster of Paris and short fiber asbestos added, had excellent plasticity and workability in gunning, and the material can be built to a thickness of plus 18 inches without slumping. Mix A, the standard, when gunned to 2½ inch thickness started to slump because of poor plasticity and workability.

This invention is intended to cover all changes and modifications of the example of the invention herein chosen for purposes of the disclosure which do not depart from the spirit and scope of the invention.

What I claim is:
1. A refractory composition comprising

(a) from about 60% to about 90% refractory aggregate, selected from the group consisting of acid refractories, neutral refractories and mixtures thereof,
(b) from about 10% to about 40% hydraulic setting agent,
(c) from about 0.1% to about 5% plaster off Paris,
(d) from about 0.01% to about 5% short fiber asbestos of from about 1/8 to about 1/64 inch in length.

2. The composition of claim 1 wherein the hydraulic setting agent is calcium aluminate cement.

3. The composition of claim 1 wherein the composition includes about 0.1% to about 2% plaster of Paris and from about 0.01% to about 0.5% short fiber asbestos.

4. The composition of claim 1 wherein the hydraulic setting agent is a minimum 90% through 200 mesh and the aggregate is finer than 3 mesh, and is about 45% to about 60% greater than 20 mesh and is about 40% to about 55% —20 mesh.

5. The composition of claim 1 wherein the aggregate is about 30% to about 40% of 4 to 10 mesh, about 15% to about 20% of 10 to 20 mesh, about 17% to about 22% of 20 to 48 mesh and the remainder finer than 48 mesh.

References Cited

UNITED STATES PATENTS

| | | | |
|---|---|---|---|
| 3,201,501 | 8/1965 | Cook et al. | 264—30 |
| 2,099,176 | 11/1937 | Scripture | 106—104 |
| 2,339,163 | 1/1944 | Friedlaender et al. | 106—104 |
| 3,360,594 | 12/1967 | Criss | 106—64 |

JAMES E. POER, Primary Examiner

U.S. Cl. X.R.

106—57, 65, 66, 69